April 3, 1928.
J. W. MEADOWCROFT
1,665,038
ELECTRIC WELDING MACHINE
Filed Dec. 7, 1925
2 Sheets-Sheet 1
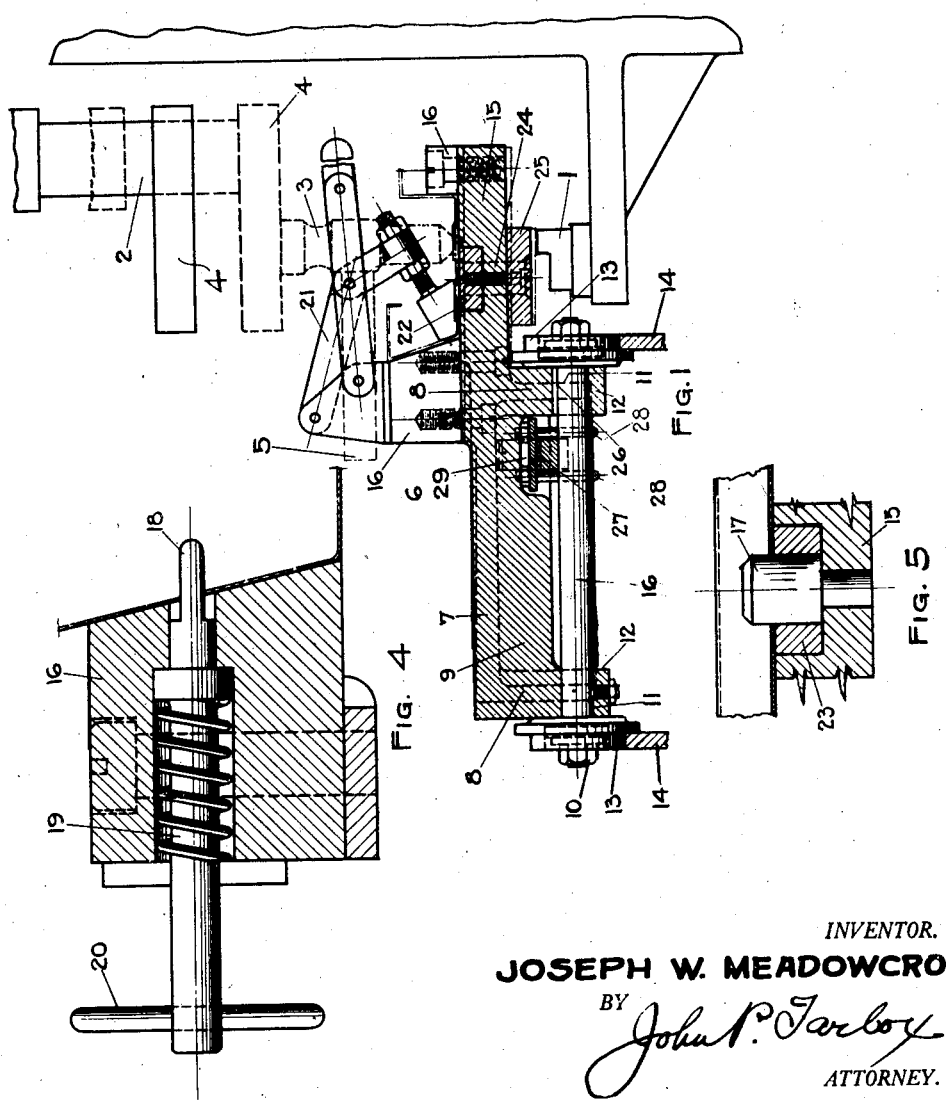
INVENTOR.
JOSEPH W. MEADOWCROFT
BY
John P. Tarbox
ATTORNEY.

April 3, 1928.
J. W. MEADOWCROFT
1,665,038
ELECTRIC WELDING MACHINE
Filed Dec. 7, 1925   2 Sheets-Sheet 2
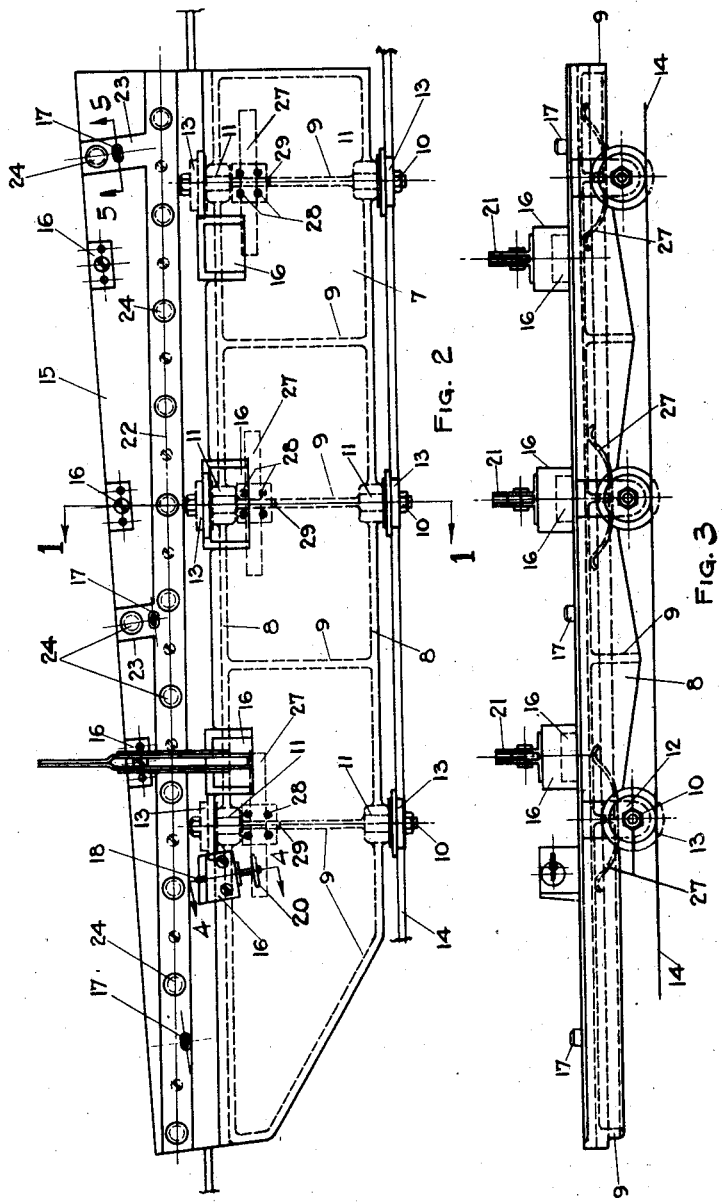
INVENTOR.
JOSEPH W. MEADOWCROFT
BY
ATTORNEY.

Patented Apr. 3, 1928.

1,665,038

UNITED STATES PATENT OFFICE.

JOSEPH W. MEADOWCROFT, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

ELECTRIC WELDING MACHINE.

Application filed December 7, 1925. Serial No. 73,564.

My invention relates to welding machines of the type known as spot welders, and specifically to work-handling mechanism therefor, adapted particularly for use where the parts or assemblies thereof to be welded are relatively large and cumbersome, such as, for instance, the door and body sills in the building of sheet steel automobile bodies.

The object of the invention is to provide improved means for conveniently supporting the parts in the position in which they are to be welded and feeding them through the welding mechanism, so that they may be quickly welded together at a plurality of spaced points, whereby to materially increase the efficiency of the welding machine in operating upon work of this character.

Another object of the invention is to provide a work-supporting carriage, which travels from one side of the machine to the other in a path extending across and between the fixed and movable electrodes of the welding mechanism, and which, with the work, is interposed between the electrodes and completes the welding circuit in the operation of the welding mechanism.

A further object of the invention is to provide a carriage of this character, which is normally out of contact with and travels freely between the electrodes to shift the work to different welding positions, and which, in the operation of the welding mechanism, is automatically movable, under the pressure applied to the work by the movable electrode, into contact with the fixed electrode to complete the welding circuit.

With these and other objects in view, the invention comprises the various novel features of construction and arrangement hereinafter set forth and illustrated in the accompanying drawings, in which—

Figure 1 is a side elevation of a welding machine embodying my invention, the carriage being shown in transverse section, taken on the line 1—1 of Figure 2, and the parts being in the inoperative positions which they occupy before welding pressure is applied.

Fig. 2 is a top plan view of my improved carriage.

Fig. 3 is a side elevation thereof; and

Figs. 4 and 5 are detailed sectional views, taken on the lines 4—4 and 5—5 of Figure 2.

Similar numerals refer to similar parts throughout the several views.

In the present embodiment of my invention the numerals 1 and 2 indicate respectively the electrodes or terminals of the spot welding machine, one of which is movable longitudinally toward the other to complete the welding circuit through the interposed lapped portions of the metal sheets to be united and to apply the pressure thereto necessary to accomplish the weld. Following the usual construction, the electrodes are arranged one above the other, with the lower electrode 1 fixed or relatively stationary and the upper electrode 2 movable. Preferably, there is also an auxiliary or hammer-head electrode 3, which is separate from the electrodes 1 and 2, and is adapted to be inserted between the bearing face of the movable electrode and the work, and may be shifted laterally relatively thereto within a limited range, so as to effect a plurality of separate spot welds within a given area of the work without the necessity of changing the position thereof. In this connection, the movable electrode 2 is preferably provided at its end with a transversely extending head or bearing number 4, having a relatively large, flat bearing face adapted to impinge against the upper end of the auxiliary electrode in its different adjusted positions. A handle 5 projects laterally from the auxiliary electrode to permit it to be conveniently manipulated by the operator of the machine. As the invention does not relate to the parts of the welding mechanism beyond the electrodes, such parts have been omitted, with the understanding that any suitable construction may be employed.

Arranged in cooperative relation to the welding mechanism is a carriage 6, which is movable from one side of the machine to the other. The body 7 of the carriage is preferably in the form of a platen, and may be cast, or otherwise suitably provided on its lower face with a plurality of reenforcing flanges. In the present instance, there are two reinforcing flanges 8 extending longitudinally of the platen in transversely spaced relation, and a plurality of transverse flanges or ribs 9, connecting the longitudinal flanges at various intervals.

The body is mounted on suitable running-gear, which, in the present instance, comprises a plurality of transverse axles 10 mounted in alined openings 11, extending through pairs of bearings 12 carried by and depending from the body 7. The bearings are shown as integral with the body and as located along the longitudinal flanges 8 and at the intersections of certain of the transverse flanges therewith. This arrangement, as well as the provision of the flanges themselves, while desirable from the standpoint of strength and rigidity, is of course not essential. The ends of the axles project beyond the bearings and have journaled thereon suitable wheels 13, which run on the rails 14 of a track extending transversely of the welding machine and support the carriage for movement from one side of the machine to the other in a predetermined horizontal path.

At one side of the carriage, the body or platen is extended transversely beyond the corresponding wheels 13 to provide an overhanging work-support 15, which is movable across and between the electrodes 1 and 2, and in a plane substantially perpendicular thereto and to the direction of movement of the movable electrode 2. This work-supporting portion of the platen may be of any suitable shape and size to suit the form and dimensions of the parts of the work to be welded together. It is shown, for example, as adapted to carry the door and body sills of steel automobile bodies. The parts of the sill are fitted between a plurality of transversely spaced blocks or abutments 16, secured at suitable intervals to the work-support and bearing respectively against the companion parts of the sill to position them with their longitudinal edges to be welded together over-lapped and extending lengthwise of the work-support between such blocks. In addition to the blocks, the work-support is preferably provided with a plurality of lugs adapted to engage through openings formed at suitable points in the parts of the sill to facilitate the assembly thereof on the work-support and hold them against longitudinal displacement. Certain of these lugs are set into and project upwardly from the work-support, as indicated at 17. Another form of lug is indicated at 18 and projects through and beyond the bearing face of one of the blocks or abutments 16, this lug being formed at the end of a spring pressed plunger 19, mounted in the said block, and having a handle 20 at its rear end, so that it may be conveniently retracted as occasion requires to draw the lug 18 into the block. A plurality of toggle clamps 21 are pivoted to certain of the other blocks 16 and are adapted to engage the parts of the sill to lock the same in assembled position.

An electrical bus bar 22 of copper or the like is inlaid in the upper face of the work-support and extends longitudinally throughout the length thereof, and also has lateral branches, as indicated at 23, so as to lie under the overlapped portions of the assembled parts to be welded together. Electrical conductors 24, such as copper rivets, connect this bus bar at intervals to another bus bar 25 secured to and extending along the lower face of the work support.

The bus bars 25 and 22 are arranged respectively opposite the fixed and movable electrodes 1 and 2 and pass across the same as the carriage is moved along its track (in the inoperative position of the welding mechanism) to feed the work therethrough and bring it to different welding positions. It is to be noted that the body 7 of the carriage is normally supported so that the bus bar 25 clears and is slightly spaced above the fixed electrode 1 and is out of contact therewith, as indicated in Fig. 1. The other bus bar 22 is designed to have electrical contact with the movable electrode 2 through its auxiliary electrode 3 and the work, but this contact is, of course, broken when the movable electrode is in raised position. Hence the carriage is normally out of contact with both the fixed and movable electrodes in the inoperative position of the welding mechanism and travels freely with respect thereto.

However, the carriage is automatically moved into electrical contact with the fixed electrode 1 by and upon the downward movement of the electrode 2 to apply the welding pressure, so that the carriage, together with the work, closes the welding circuit between the electrodes. To this end the carriage is mounted to move out of its path of normal movement and with the movable electrode 2, to cause the bus bar 25 to contact with the fixed electrode 1. In the preferred form of such mounting, the openings 11 of the bearings 12 on the overhanging side of the carriage are vertically elongated, as indicated at 26, and the body of the carriage is yieldingly supported along that side upon bowed leaf springs 27, bearing at their ends against the under face of the body and secured intermediate of their ends to the respective axles 10 by means of clamps 28. The transverse flanges 9, extending across the lower face of the body adjacent the axles 10, are preferably recessed or cut away, as indicated at 29, to accommodate the clamps and provide vertical clearance therefor. By virtue of this arrangement, the body of the carriage is yieldingly supported in its normal or horizontal position, and is adapted to be moved bodily or tilted slightly laterally with respect to the running-gear, under downward pressure applied by the electrode 2, so as to assume the position indicated in Fig. 2, with the overlapping work-support 15 resting upon the fixed electrode 1, with its bus bar 25 in contact therewith.

It will be understood that other forms of mounting may be employed between the body and the running gear of the carriage to afford the desired movement of the former independently of the latter. Various other changes may be made in the design and details of construction and arrangement of the parts without departing from the spirit of my invention, as defined in the appended claims.

Having thus described my invention, I claim and desire to protect by Letters Patent of the United States:

1. In an electric spot welding machine, the combination with the fixed and movable electrodes thereof, of a track extending transversely with respect to said elctrodes, and a work-supporting carriage running on said track in a path extending across and between said electrodes and adapted with the work to close the welding circuit therebetween.

2. In an electric spot welding machine, the combination with the fixed and movable electrodes thereof, of a work-supporting platen movable across and between said electrodes, electrical bus bars secured to the faces of said platen opposite the respective electrodes, and an electrical connection between said bus bars.

3. In an electric spot welding machine, the combination with the fixed and movable electrodes thereof, of a work-supporting platen movable across and between said electrodes, electrical bus bars secured to the face of said platen opposite the respective electrodes and extending in the direction of the movement of said platen, and electrical connections between said bus bars.

4. In an electric spot welding machine, the combination with the fixed and movable electrodes thereof, of a work-supporting carriage movable across and between said electrodes and normally out of contact therewith, and means for automatically moving said carriage into electrical contact with said fixed electrodes by and upon the operation of the movable electrode.

5. In an electric spot welding machine, the combination with the fixed and movable electrodes thereof, of a work-supporting carriage movable in a predetermined path across and between said electrodes and normally out of contact therewith, and means mounting said carriage to move out of said path in the direction of movement of said movable electrode and into electrical contact with said fixed electrode.

6. In an electric spot welding machine, the combination with the fixed and movable electrodes thereof, of a work-supporting carriage comprising a running-gear, a platen carried thereby and movable therewith across and between said electrodes, and a movable connection between said platen and running-gear permitting the former to move relatively to the latter in the direction of said electrodes.

7. In an electric spot welding machine, the combination with the fixed and movable electrodes thereof, of a work-supporting carriage comprising a running-gear, a platen carried thereby and movable therewith across and between said electrodes, said platen being also movable relatively to said running-gear in the direction of said electrodes, and means yieldingly supporting the platen upon the running gear to travel across the fixed electrode in normally spaced relation thereto.

8. In an electric spot welding machine, the combination with the fixed and movable electrodes thereof, of a carriage traveling across said machine in cooperative relation to said electrodes and comprising a running-gear, a body mounted on the running-gear, and a work-support carried by the body and projecting laterally at one side of the carriage and overhanging the running-gear and movable across and between said electrodes.

9. A work-handling carriage for welding machines comprising a running-gear and a platen mounted thereon and extending laterally at one side of the carriage and overhanging the running-gear, and work engaging means on the overhanging portion of the platen.

10. A work-supporting carriage for welding machines comprising a running-gear, a body mounted on the running-gear, a work-support carried by the body and extending laterally at one side of the carriage and overhanging the running-gear, electrical bus bars secured to the work-support on the opposite faces thereof, and an electrical connection between the bus bars.

11. A work-supporting carriage for welding machines comprising a running-gear, a body mounted on the running-gear, an overhanging work-support carried by the body and extending laterally beyond the running-gear at one side of the carriage, and a spring interposed between the body and the running-gear, and yieldingly supporting the former upon the latter.

In testimony whereof I hereunto affix my signature.

JOSEPH W. MEADOWCROFT.